United States Patent [19]

Yoshino et al.

[11] Patent Number: 4,997,159

[45] Date of Patent: Mar. 5, 1991

[54] LOGIC VALVE

[75] Inventors: Kazunori Yoshino, Kobe; Nàotaka Dohke, Akashi, both of Japan

[73] Assignee: Shin Caterpillar Mitsubishi Ltd., Tokyo, Japan

[21] Appl. No.: 537,513

[22] Filed: Jun. 13, 1990

[30] Foreign Application Priority Data

Jul. 31, 1989 [JP] Japan .............................. 1-89878[U]

[51] Int. Cl.[5] .............................................. F16K 31/383

[52] U.S. Cl. ........................................ 251/29; 91/461; 251/38

[58] Field of Search ........................ 91/461; 251/29, 38

[56] References Cited

U.S. PATENT DOCUMENTS 2,805,038 9/1957 Towler et al. .................... 251/38 X

*Primary Examiner*—Gerald A. Michalsky
*Attorney, Agent, or Firm*—Morris Law Firm

[57] ABSTRACT

A main poppet body of a logic valve receives inlet pressure at first and second ends. A flow-restricting orifice between the first and second ends produces a differential pressure between the two ends when inlet fluid is permitted to flow from the second end. The main poppet body is normally resiliently seated against a seat. A pilot poppet body, movable in the main poppet body, seats against a seat in the main poppet body. The pilot poppet body, when sealed to its seat, seals the fluid at the second end of the main poppet body from flowing. Thus, equal pressures exist at opposed ends of the main poppet body, and the main poppet body remains in its sealing position. An external source of controllable pilot pressure acts on the pilot poppet body to unseal it from its seat. This permits a flow of inlet fluid from the second end of the main poppet body, and produces a pressure reduction at the second end. The differential pressure between the first and second ends of the main poppet body tends to move the main poppet body out of its sealing position, and consequently to permit an inlet flow past the seat of the main poppet body. This inlet fluid flows to a drain. The position of the main poppet body varies in substantially linear relationship to the pilot pressure applied to the pilot poppet body.

7 Claims, 2 Drawing Sheets

LOGIC VALVE

BACKGROUND OF THE INVENTION

1. Field of the Invention

The present invention relates to a logic valve of a type that controls pressure in a spring chamber to control the volumetric flow of oil to a hydraulic valve used for construction machines and similar machines.

2. Description of the Prior Art

The applicant of the present invention has previously applied for a patent for a pressure compensating type logic valve with the specification and the drawings of Japanese Patent Application No. 319169/1988, which is a prior invention of the present invention.

As shown in FIGS. 3 and 4 the referenced pressure compensating type logic valve comprises a sleeve 12 fitted inside a housing 11. A logic valve poppet body 13 is slidably fitted in sleeve 12. Logic valve poppet body 13 includes, at one side thereof, a loading pressure inlet portion $P_{IN}$, which is used as the flow controlling portion of a hydraulic pressure control valve and through which loading pressure is introduced. At the other side, logic valve spring chamber 14 contains a spring 15. Spring 15 urges logic valve poppet body 13 against a seat 16 connected to a drain port $T_1$. Pilot spools 18 and 19 are installed in a separate housing 21. Pressure from loading pressure inlet port $P_{IN}$ acts upon an end surface of a pilot spool 20 through an orifice 29. Pilot spool 20 is installed in housing 22 to control fluid conducted from loading pressure inlet port $P_{IN}$ to spring chamber 14 at the other side through an orifice 17. Pressure from a spring 23 is applied to pilot spool 19 and a pilot pressure in the direction against spring 23 is applied from a valve controlled from outside to a pilot pressure chamber 24 through an external pilot pressure inlet port $P_1$. Pressure is conducted from logic valve spring chamber 14 into a pressure chamber 27 through a detection path 25 and an orifice 26. The pressure in pressure chamber 27 is applied to pilot spool 18 in the axial direction opposite to the force of spring 23, and loading pressure conducted from loading pressure inlet portion $P_{IN}$ into the other pressure chamber 30 through the other detection path 28 and orifice 29 is applied upon pilot spool 20 in the same axial direction as that of the spring force thereof. Oil in spring chamber 14 for pressure is bled into drain port $T_2$ through bleed groove 32 and seat 31 when the conical portion of spool 19 has been detached from seat 31.

In case differential pressure has occurred between loading pressure inlet port $P_{IN}$ and spring chamber 14, such differential pressure works upon pilot spools 18 and 20 through the two detection paths 25 and 28 respectively and becomes balanced, with respect to the force of pilot spool 19 in the axial direction, with pilot pressure introduced from the externally controlled valve through pilot pressure inlet port $P_1$ as well as with the force of spring 23. By taking advantage of such balance, it is possible to control the stroke of the logic valve in a stable condition without being under the influence of the absolute value of loading pressure of loading pressure inlet port $P_{IN}$.

The above prior invention requires spools 18, 19 and 20 to control strokes of logic valve poppet body 13, and housings 21 and 22 to contain these spools separately from logic valve poppet body 13. Therefore the valve of the prior invention presents the problem that it is more complex and larger than necessary.

Further, it has been observed that, when pressure is applied at loading pressure inlet port $P_{IN}$, leakage occurs at four locations: leak $Q_1$ at the diametrical space between sleeve 12 and logic valve poppet body 13; leak $Q_2$ at the diametrical space between spool 20 and housing 22, into which oil is conducted from loading pressure inlet port $P_{IN}$ through path 28, orifice 29, etc.; and leaks $Q_3$ and $Q_4$ at the diametrical space between pilot spools 18 and 19 and housing 21, into which internal pressure in logic valve spring chamber 14 is conducted. Since it is desirable to keep the amount of leakage as small as possible, the number of locations of possible leakage also should be kept as small as possible.

An object of the present invention is to make a logic valve more compact with less leakage.

SUMMARY OF THE INVENTION

A logic valve has a logic valve poppet body 44 slidably fitted inside a housing 41. A loading pressure inlet port $P_{IN}$ at one end of logic valve poppet body 44 leads to a control device 96. A logic valve spring chamber 55, containing a spring 56, is disposed at the other end of logic valve poppet body 44. Spring 56 urges logic valve poppet body 44 against a seat 52 between loading pressure inlet port $P_{IN}$ and a drain port $T_1$. Loading pressure inlet port $P_{IN}$ is connected through an orifice 77 to logic valve spring chamber 55. A pilot spool 46, controlled by external pilot pressure, is installed in the bleed passage from logic valve spring chamber 55 to the outside. The pilot spool 46 is slidably fitted in logic valve poppet body 44. A pilot pressure inlet port $P_1$ is connected through a surrounding groove 81 to pressure chamber 66 for controlling the pilot spools. Groove 81 has a width at least as great as the sliding distance of logic valve poppet body 44. The pilot pressure bleed path leads outside housing 41 through a surrounding groove 93 having a width at least as great as the sliding distance of logic valve poppet body 44.

Logic valve poppet body 44 is slidably fitted inside housing 41 with a sleeve 43 therebetween. Surrounding groove 81 introduces external pilot pressure and surrounding groove 93 of pilot pressure bleed path is formed in the inner surface of sleeve 43.

One end of pilot spool 46 faces pilot spool spring chamber 69. A spring 70, installed inside pilot spool spring chamber 69, at the other end of pilot spool 46, urges the pilot spool 46 against seat 71 connected to logic valve spring chamber 55. A pilot spool spring chamber 69 is connected, through an inner hole 88 of pilot spool 46, to a bleed chamber 89 formed at the pressure exhaust side of seat 71. A pressure chamber 66 for external pilot pressure is situated between pilot spool spring chamber 69 and bleed chamber 89. Pilot pressure in pressure chamber 66 urges pilot spool 46 in the axial direction against the resisting the force of spring 70 in the pilot spool spring chamber. A sub spool 47 is slidably fitted in logic valve poppet body 44, in order to convey, in the same direction as the force of spring 70 in the pilot spool spring chamber, pressure at loading pressure inlet port $P_{IN}$ to pilot spool 46.

The length of surrounding 'groove 81 ensures that, regardless of location of logic valve poppet body 44, pilot pressure at outside pilot pressure inlet port $P_1$ is always fed to pressure chamber 66 for controlling the pilot spool 46. Similarly internal exhaust pressure is bled out of housing 41 through surrounding groove 93.

External pilot pressure is conducted to pilot spool 46 through surrounding groove 81 of sleeve 43 and internal exhaust pressure is bled to the outside through surrounding groove 93 of sleeve 43.

Although the logic valve of the present invention does not eliminate leak $Q_1$ at the diametrical space between logic valve poppet body 44 and sub spool 47 or leak $Q_2$ at the diametrical space around logic valve poppet body 44, leaks $Q_3$ and $Q_4$ present in the aforementioned prior invention have been eliminated because of the configuration having pilot spool spring chamber 69 connected to bleed chamber 89, at both sides of pressure chamber 66. This permits pilot pressure from the outside to prevent the internal pressure of logic valve spring chamber 55 (i.e. higher pressure) from working upon the pressure in pressure chamber 66 of the pilot pressure (lower pressure). The location of pilot spool 46 is determined by the balance between the forces of pressure conducted from logic valve spring chamber 55 to pilot spool 46, the force of pilot pressure conducted from outside into pressure chamber 66, the force of spring 70 in pilot spool spring chamber 69, which works in the opposite direction to the above two forces, and the force applied from sub spool 47 to pilot spool 46.

According to an embodiment of the invention, there is provided, a logic valve comprising: a logic valve poppet body slidably fitted inside a housing, a loading pressure inlet port in the housing leading to an object to be controlled, a drain port, a seat, a spring in logic valve spring chamber of the housing effective for urging the logic valve poppet body against a seat functionally disposed between the loading pressure inlet port and the drain port, an orifice connecting the loading pressure inlet port and the logic valve spring chamber, a pilot spool located in a bleed passage from the logic valve spring chamber to the outside, means for permitting control of the pilot spool from a source of pilot pressure external to the housing, the pilot spool is slidably fitted inside the logic valve poppet body, an external pilot pressure inlet port connected to a surrounding groove about the logic valve poppet body, the surrounding groove having a width at least as great as a range of motion of the logic valve poppet body, the surrounding groove being connected to a pressure chamber for controlling the pilot spool, a pilot pressure bleed passage leading to an exterior of the housing through a second surrounding groove, and the second surrounding groove having a width at least as great as a sliding distance of the logic valve poppet body.

According to a feature of the invention, there is provided a logic valve comprising: a main poppet body, a first tapered portion on the main poppet body, a first seat, first means for resiliently urging the first tapered portion into sealing contact with the seat, a pilot poppet body in the main poppet body, a second seat in the main poppet body, a second tapered portion on the pilot poppet body, second means for resiliently urging the second tapered portion into sealing contact with the second seat, first means for applying an inlet fluid pressure to a first end of the main poppet body, second means for applying the inlet fluid pressure to a second end of the main poppet body, the second means including a flow-restricting orifice, a first pressure receiving surface on the pilot poppet body, means for applying a controlled external oil pilot pressure to the first pressure receiving, the controlled external oil pilot pressure being in a direction to oppose the second means for resiliently urging, whereby the second tapered surface is moved out of sealing contact with the second seat, means for permitting a flow of the inlet fluid pressure at the second end of the main poppet body, past the second seat, whereby the flow-restricting orifice reduces a pressure at the second end, and a differential pressure on the main poppet body is produced, the differential pressure being in a direction to oppose the first means for resiliently urging, whereby the main poppet body is moved in a direction to unseal the first tapered portion from the first seat, and means for permitting a controlled flow of the inlet fluid past the first seat in a quantity substantially proportional to a linear motion of the main poppet body, whereby the motion of the main poppet body is substantially linearly proportional to the controlled external oil pilot pressure.

DETAILED DESCRIPTION OF THE PREFERRED EMBODIMENT

Figure 1:
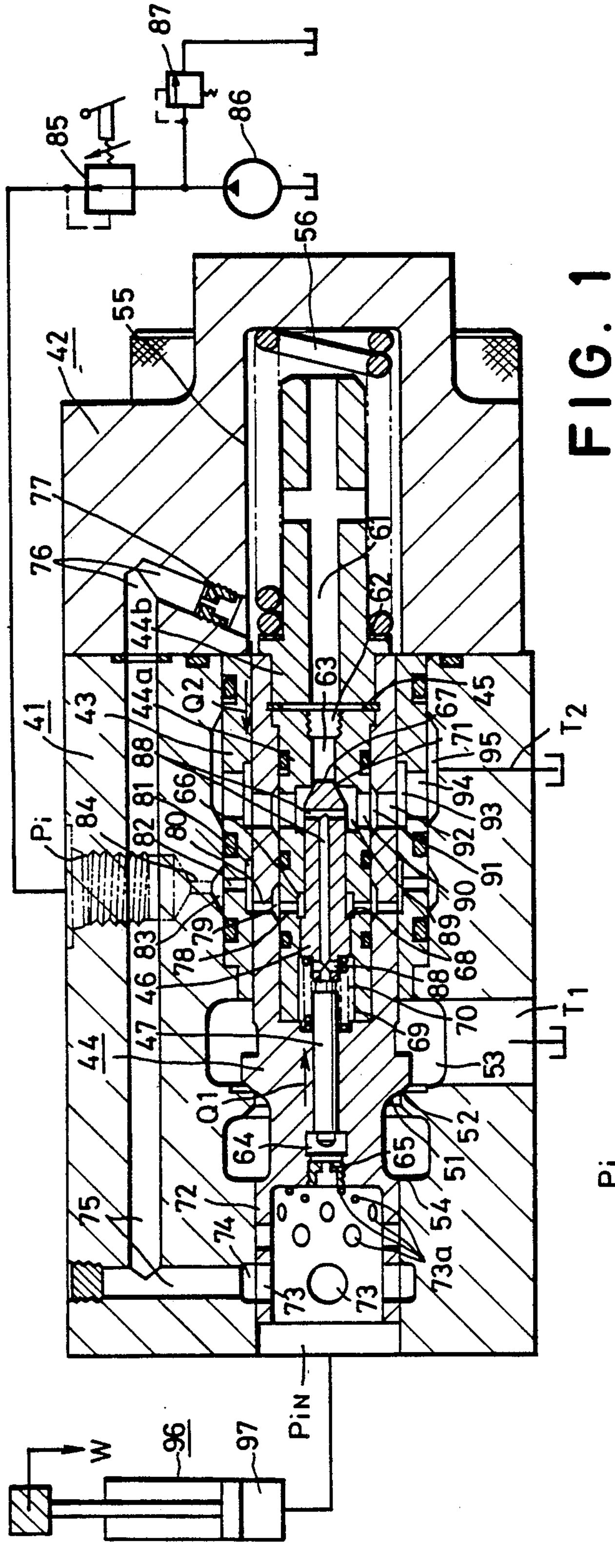
FIG. 1 is a cross section of an embodiment of a logic valve according to the present invention.

In FIG. 1, numerals 41 and 42 denote housings of a metering type logic valve. Housing 41 includes a sleeve 43 fitted therein and stopped by housing 42. Logic valve poppet bodies 44 and **44*a* are slidably fitted into sleeve 43. Logic valve poppet body 44*a* is installed in logic valve poppet body 44, comprising a part thereof, and fixed to logic valve poppet body 44 by means of a snap ring 45. Pilot spool 46 and sub spool 47 are slidably fitted in logic valve poppet body 44*a* and logic valve poppet body 44 respectively. A spring receive 44*b* is fitted in the opening of logic valve poppet body 44, and spring 56, which will be described hereunder, is attached to spring receiver 44*b***.

Housing 41 includes loading pressure inlet port $P_{IN}$ located at the inlet side of logic valve poppet body 44. Housing 41 is sectioned to form a drain oil chamber 53 and pressure oil chamber 54, which are connected to the tank through a drainport $T_1$ by means of seat 52 facing a tapered portion 51 of logic valve poppet body 44. Housing 42 contains logic valve spring chamber 55 located opposite loading pressure inlet port $P_{IN}$ of logic valve poppet body 44. Spring 56, in valve spring chamber 55 urges tapered portion 51 against seat 52.

Spring chamber 55 is connected to pressure chamber 63 through a path 61 bored in spring receiver **44*b* and a threaded hole 62 bored through sleeve 44*a* in the logic valve poppet body for the purposes of disassembly. Loading pressure inlet port $P_{IN}$ is also connected through an orifice 65 to a pressure chamber 64, which is located opposite pressure chamber 63 with pilot spool 46 and sub spool 47** therebetween.

Pilot spool 46 has pressure receiving surfaces 67 and 68 facing pressure chamber 63 and pressure chamber 66, respectively. Receiving surface 67 is urged against seat 71 by spring 70 in pilot spool spring chamber 69. Sub spool 47 is maintained in contact with pilot spool 46 by oil hydraulic pressure in pressure chamber 64.

Loading pressure inlet port $P_{IN}$ and spring chamber 55 are interconnected through a hole 73 bored in a cylindrical portion 72, which slides in loading pressure inlet port $P_{IN}$ of logic valve poppet body 44, a surrounding groove 74 and a path 75 in housing 41, a path 76 in housing 42, and an orifice 77 in a path 76.

Pressure chamber 66 surrounding pilot spool 46 is connected to the outlet side of an external oil pressure pilot valve (pressure reducing valve) 85 through a hole 78 bored in sleeve 44a in the logic valve poppet body surrounding groove 79, a hole 80 bored in sleeve 43, surrounding groove 41, a hole 84 bored in housing 41, and external pilot pressure inlet $P_1$. An oil pressure pilot pump 86 and a relief valve 87 are connected to the inlet side of oil pressure pilot valve 85.

Oil in spring chamber 69 is connected through inner hole 88 bored through pilot spool 46, bleed chamber 89, a hole 90 in logic valve poppet body 44a, surrounding groove 91, hole 92 in logic valve poppet body 44, surrounding groove 93, a hole 94 bored in sleeve 43, surrounding groove 95 and drain port $T_2$ in housing 41.

A head end 97 of control device 96, upon which load W acts, is connected to loading pressure inlet port $P_{IN}$.

Surrounding groove 81 in the passage to conduct pilot pressure and surrounding groove 93 in the bleed passage have a width in the axial direction at least as great as the axial movement of holes 80 and 92 bored in logic valve poppet body 44.

With the above configuration, loading pressure at loading pressure inlet port $P_{IN}$ is conducted into pressure chamber 64 of sub spool 47 through orifice 65. Pressure in spring chamber 55 is conducted into pressure chamber 63 of pilot spool 46 through path 61. Valve-outlet pressure of external oil pressure pilot valve (pressure reduction valve) 85 is conducted from external pilot pressure inlet port $P_1$, to pressure chamber 66 to act upon ring-shaped pressure receiving surface 68 of pilot spool 46. Pilot spool 46 is urged into contact with seat 71 by spring 70, in the normal condition, when valve-outlet pressure from oil pressure pilot valve 85 is not present. Sub spool 47, is urged against pilot spool 46 by pressure through orifice 65 in pressure chamber 64.

Figure 2:
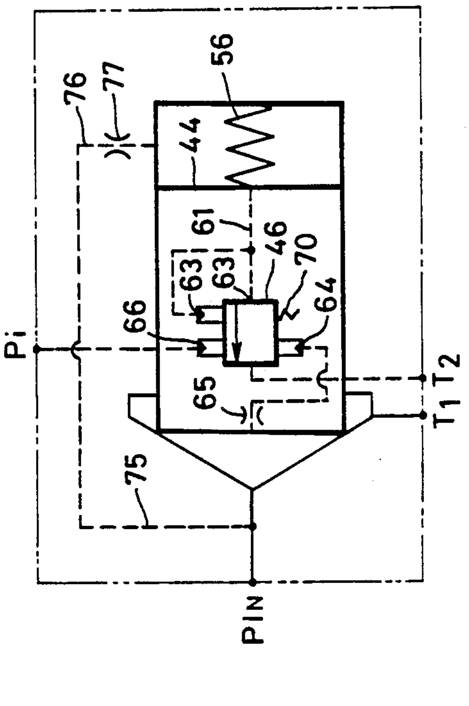
FIG. 2 is a schematic diagram of the logic valve of FIG. 1.

FIG. 2 is a schematic drawing of the logic valve shown in FIG. 1 with the same numerals identifying corresponding parts. The schematic diagram will aid in understanding the following.

When the operation lever of external oil pressure pilot valve 85 is placed in its middle position, no valve-outlet pressure is produced. Therefore, the pressure in pressure chamber 66 is equal to that in the tank. At this time, the pressure at loading pressure inlet port $P_{IN}$ acts via paths 75 and 76, orifice 77, spring chamber 55, path 61 and pressure chamber 63 upon pilot spool 46. The pressure also action sub spool 47 via pressure chamber 64. As the pressure-applied area of pilot spool 46 against pressure chamber 63 is equal to the pressure-receiving area of sub spool 47 against pressure chamber 64, a balance is maintained in which pilot spool 46 is pushed against seat 71 by the force of the spring 70.

When the operation lever of external oil pressure pilot valve 85 is operated, the force of valve-outlet pressure of pilot valve 85 multiplied by the pressure-receiving area of ring-shaped pressure receiving surface 68 is balanced by a preset load of spring 70. When the operation lever is further fine-adjusted, the force generated by the outlet pressure of external pilot valve 85 becomes somewhat more than the preset load of spring 70. Consequently, pilot spool 46 is moved out of contact with seat 71. Pressurized oil in spring chamber 55 flows to bleed chamber 89 through path 61, pressure chamber 63 and seat 71. At that time, pressurized oil flows into spring chamber 55 through orifice 77. Because of the restriction resistance of orifice 77, the pressure in spring chamber 55 is lower than the pressure at loading pressure inlet port $P_{IN}$, pilot spool 46 becomes balanced at a position slightly away from seat 71. The distance the pilot spool is thus moved is normally very small because the above flow rate is restricted by orifice 77.

When the outlet pressure of external oil pressure pilot valve 85 (the pressure upon ring-shaped pressure-receiving surface 68 of pilot spool 46) is increased by further operation of the operation lever of external oil pressure pilot valve 85, pilot spool 46 moves further away from seat 71, differential pressure $\Delta P$ between the pressure at loading pressure inlet port $P_{IN}$ and the pressure in spring chamber 55 increases.

When pilot spool 46 moves further away from seat 71 by the increasing outlet pressure of external oil pressure pilot valve 85, the force which is the product of the pressure-receiving section area A of logic valve poppet body 44 by the differential pressure $\Delta P$ between loading pressure inlet port $P_{IN}$ and spring chamber 55 balances preset load of spring 56. When the outlet pressure increases by further operation of the operation lever of oil pressure pilot valve 85, the differential pressure $\Delta P$ becomes larger. The force of $A \cdot \Delta P$ exceeds the preset load of spring 56, and consequently logic valve poppet body 44 starts to lift, and tapered portion 51 thereof moves away from seat 52.

When the stroke of the operation lever of oil pressure pilot valve 85 increases even further, outlet pressure thereof is further increased, and differential pressure $\Delta P$ acting upon logic valve poppet body 44 is also increased. This moves tapered portion 51 further away from seat 52. As a result, holes 73a bore in cylindrical portion 72 begin to move into positions communicating with pressure oil chamber 54. When the stroke of the operation lever of external oil pressure pilot valve 85 is even further increased the differential pressure $\Delta P$ acting upon logic valve poppet body 44 increases proportionally. The lifting distance (stroke) of logic valve poppet body 44 also increases proportionally in the direction of increasing load on spring 56. Therefore, the aperture area of holes 37a opening into pressure oil chamber 54 also gradually increases.

When a logic valve as above is used to control the flow rate for switching the operational direction of the actuator 96, as described above, differential pressure $\Delta P$ between loading pressure inlet port $P_{IN}$ and spring chamber 55 is principally controlled as a linear function of valve-outlet pressure of external pilot valve 85, and therefore the strokes of logic valve poppet body 44 can be very accurately controlled. Further, as it is not affected by absolute value of the loading pressure produced at loading pressure inlet port $P_{IN}$, a logic valve according to the present invention can be used for the meter-out flow control circuit (a circuit to smooth operation of an actuator subject to variation of load)) of cylinder actuator 96, which is expected to operate with consistent stability.

Figure 3:
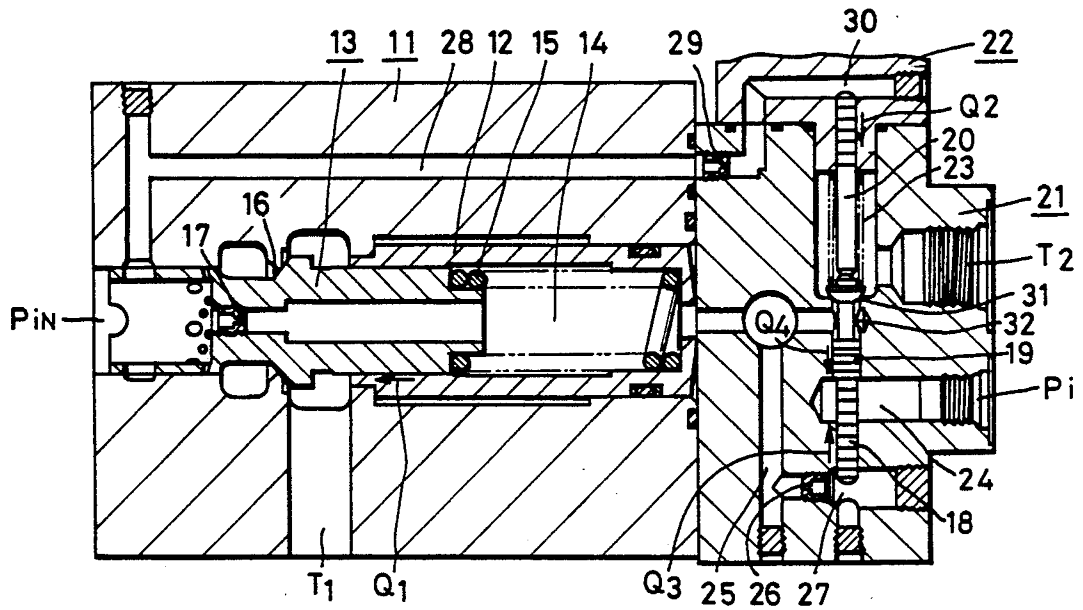
FIG. 3 (PRIOR ART)
FIG. 3 is a cross section of a conventional logic valve.
Figure 4:
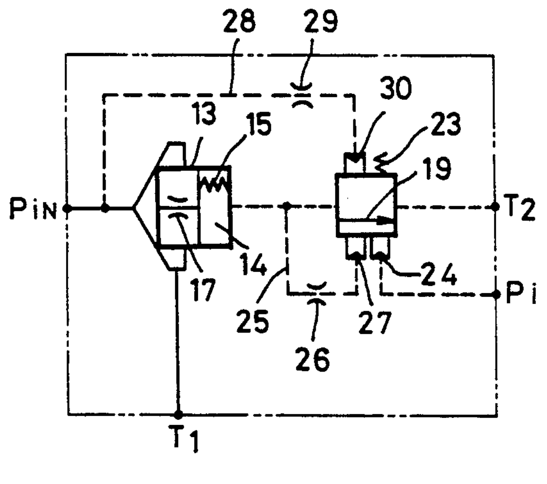
FIG. 4 (PRIOR ART)
FIG. 4 is a schematic diagram of the logic valve of FIG. 3.

The following compares the logic valve according to the present invention shown in FIG. 1 with the prior example shown in FIG. 3.

Firstly, according to the logic valve shown in FIG. 1, the stroke distance of logic valve poppet body 44 is determined by a balance between the pressure at loading pressure inlet port $P_{IN}$, and the pressure in spring chamber 55, which act on pressure receiving areas at both right and left side of logic valve poppet body 44, (which are identical in case of the embodiment shown in FIG. 1) and the force of spring 56. Logic valve poppet body 44 of the present logic valve has therein a mechanism (spools 46 and 47, spring 70, etc.) to linearly control the differential pressure between loading pressure inlet port $P_{IN}$ and spring chamber 56, which is the factor to determine the aforementioned balance, by means of external pilot pressure. The prior example shown in FIG. 3, however, employs stroke control mechanisms, such as spools 18, 19 and 20, spring 23, etc., which are installed in housing 21 and 22, which are separated from logic valve poppet body 13.

A logic valve shown in FIG. 1 integrates pressure chamber 27 and bleed groove 32 in the prior example shown in FIG. 3 for applying pressure in logic valve spring chamber 14 to spool 18 into a single location, i.e. pressure chamber 63. In addition, the present invention integrates the spools 18 and 19 in FIG. 3 into a single ridged spool 46, so that external pilot pressure applied to pilot pressure port $P_1$ is introduced into pressure chamber 66 of the pilot spool 46 in order to combine it with propulsive force of pressure in pressure chamber 63.

Further, the present invention shown in FIG. 1 uses only 28 parts in contrast to the 33 parts required by a logic valve of the prior example shown in FIG. 3.

Furthermore, with respect to a logic valve shown in FIG. 1, leakage occurs at two locations: leak $Q_1$ at the diametrical space between logic valve poppet body 44 and sub spool 47; and leak $Q_2$ at the diametrical space between the outer surface of logic valve poppet body 44 and the inner surface of sleeve 43. In contrast to this, it has been already described that the logic valve shown in FIG. 3 is subject to leakage at four locations.

It is possible to install a pilot spool 46 to control strokes of the logic valve poppet body 44 inside the logic valve poppet body, economizing on the space for the stroke control mechanism centering around the pilot spool, and thereby making the configuration of the logic valve compact and reducing the number of parts necessary for the logic valve.

A surrounding groove for introducing external pilot pressure and a surrounding groove for pilot a pressure bleed passage, both necessary for having a pilot spool inside the valve, can be easily formed by means of a sleeve.

The logic valve has the advantage that the number of locations where leakage may occur inside the valve are reduced from four locations in case of the prior example to two locations, thereby reducing the amount of leakage.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A logic valve comprising:

a logic valve poppet body slidably fitted inside a housing;

a loading pressure inlet port in said housing leading to an object to be controlled;

a drain port;

a seat;

a spring in a logic valve spring chamber of said housing effective for urging said logic valve poppet body against a seat functionally disposed between said loading pressure inlet port and said drain port;

an orifice connecting said loading pressure inlet port and said logic valve spring chamber;

a pilot spool located in a bleed passage from the logic valve spring chamber to the outside;

means for permitting control of a said pilot spool from a source of pilot pressure external to said housing;

said pilot spool is slidably fitted inside said logic valve poppet body;

an external pilot pressure inlet port connected to a surrounding groove about said logic valve poppet body;

said surrounding groove having a width at least as great as a range of motion of said logic valve poppet body;

said surrounding groove being connected to a pressure chamber for controlling the pilot spool; and a pilot pressure bleed passage leading to an exterior of said housing through a second surrounding groove; and said second surrounding groove having a width at least as great as a sliding distance of said logic valve poppet body.

2. A logic valve of claim 1 wherein:

a sleeve is disposed in said housing;

said logic valve poppet body is slidably fitted inside said sleeve; and a third surrounding groove is disposed on an inner surface of said sleeve to introduce external pilot pressure to said logic valve;

a fourth surrounding groove on an inner surface of said sleeve to form a pilot pressure bleed passage.

3. A logic valve of claim 2 wherein:

a pilot spool spring chamber;

one end of said pilot spool faces the pilot spool spring chamber, and the other end is pushed by a spring attached in said pilot spool spring chamber against a seat connected to the logic valve spring chamber;

said pilot spool spring chamber leads to a bleed chamber formed at the pressure exhaust side of said seat through an inner hole in the pilot spool;

a pressure chamber for external pilot pressure, which pushes said pilot spool in the axial direction to provide resistance to the spring in said pilot spool spring chamber, is formed between the pilot spool spring chamber and the bleed chamber; and a sub spool, which conveys pressure at said loading pressure inlet port to the pilot spool in the same direction as the spring in the pilot spool spring chamber is slidably fitted in the logic valve poppet body.

4. A logic valve of claim 1 wherein:

a pilot spool spring chamber;

one end of said pilot spool faces the pilot spool spring chamber, and the other end is pushed by a spring attached in said pilot spool spring chamber against a seat connected to the logic valve spring chamber;

said pilot spool spring chamber leads to a bleed chamber formed at the pressure exhaust side of said seat through an inner hole in the pilot spool;

a pressure chamber for external pilot pressure, which pushes said pilot spool in the axial direction to provide resistance to the spring in said pilot spool spring chamber, is formed between the pilot spool spring chamber and the bleed chamber; and a sub spool, which conveys pressure at said loading pressure inlet port to the pilot spool in the same direction as the spring in the pilot spool spring chamber is slidably fitted in the logic valve poppet body.

5. A logic valve comprising;

a main poppet body;

a first tapered portion on said main poppet body;

a first seat;

first means for resiliently urging said first tapered portion into sealing contact with said seat;

a pilot poppet body in said main poppet body;

a second seat in said main poppet body;

a second tapered portion on said pilot poppet body;

second means for resiliently urging said second tapered portion into sealing contact with said second seat;

first means for applying an inlet fluid pressure to a first end of said main poppet body;

second means for applying said inlet fluid pressure to a second end of said main poppet body;

said second means including a flow-restricting orifice;

a first pressure receiving surface on said pilot poppet body;

means for applying a controlled external oil pilot pressure to said first pressure receiving;

said controlled external oil pilot pressure being in a direction to oppose said second means for resiliently urging, whereby said second tapered surface is moved out of sealing contact with said second seat;

means for permitting a flow of said inlet fluid pressure at said second end of said main poppet body, past said second seat, whereby said flow-restricting orifice reduces a pressure at said second end, and a differential pressure on said main poppet body is produced;

said differential pressure being in a direction to oppose said first means for resiliently urging, whereby said main poppet body is moved in a direction to unseal said first tapered portion from said first seat; and means for permitting a controlled flow of said inlet fluid past said first seat of a quantity substantially proportional to a linear motion of said main poppet body, whereby said motion of said main poppet body is substantially linearly proportional to said controlled external oil pilot pressure.

6. A logic valve according to claim 5, wherein said means for permitting a controlled flow includes:

a plurality of holes exposed to said inlet fluid; and means for partially communicating said plurality of holes with a drain in proportion to motion of said main poppet body.

7. A logic valve according to claim 6, wherein said means for partially communicating includes:

a cylindrical portion of said main poppet body, and a cylinder in which said cylindrical portion moves;

at least one hole in one of said cylindrical portion and said cylinder;

said at least one hole being substantially sealed by fitting to the other of said cylindrical portion and said cylinder when said main poppet body is in a position seating said first tapered portion against said first seat; and said at least one hole becoming progressively unsealed as said main poppet body moves in a direction unsealing said first tapered portion from said first seat.

* * * * *